(12) United States Patent
Lee et al.

(10) Patent No.: US 10,135,378 B2
(45) Date of Patent: Nov. 20, 2018

(54) V/F CONTROL METHOD FOR SUPPRESSING CURRENT OSCILLATION OF INDUCTION MOTOR

(71) Applicant: Eaton Corporation, Cleveland, OH (US)

(72) Inventors: Kevin Lee, Menomonee Falls, WI (US); Dawei Li, Shenzhen (CN); Anbo Yu, Shenzhen (CN)

(73) Assignee: Eaton Intelligent Power Limited, Dublin (IE)

( * ) Notice: Subject to any disclaimer, the term of this patent is extended or adjusted under 35 U.S.C. 154(b) by 268 days.

(21) Appl. No.: 15/021,335

(22) PCT Filed: May 30, 2014

(86) PCT No.: PCT/CN2014/078882
§ 371 (c)(1),
(2) Date: Mar. 11, 2016

(87) PCT Pub. No.: WO2015/035801
PCT Pub. Date: Mar. 19, 2015

(65) Prior Publication Data
US 2016/0226420 A1    Aug. 4, 2016

(30) Foreign Application Priority Data

Sep. 16, 2013   (CN) .......................... 2013 1 0421736

(51) Int. Cl.
*H02P 25/22*  (2006.01)
*H02P 6/16*   (2016.01)
(Continued)

(52) U.S. Cl.
CPC ............ *H02P 27/047* (2013.01); *H02P 21/05* (2013.01); *H02P 23/04* (2013.01)

(58) Field of Classification Search
CPC ............... H02P 21/06; H02P 8/34; H02P 9/42
See application file for complete search history.

(56) References Cited

U.S. PATENT DOCUMENTS 5,959,431 A    9/1999  Xiang
2002/0149342 A1  10/2002 Nakata et al.
(Continued)

FOREIGN PATENT DOCUMENTS

CN   101330273 A   12/2008
CN   102647142 A   8/2012
CN   103236816 A   8/2013

*Primary Examiner* — Bickey Dhakal
*Assistant Examiner* — Charles S Laughlin
(74) *Attorney, Agent, or Firm* — Ziolkowski Patent Solutions Group, SC (57) ABSTRACT

The present invention provides a V/F control method for an induction motor comprising: extracting a reactive current and an active current and performing a differential calculation on them respectively to obtain a differential of the reactive current and a differential of the active current; multiplying the differential of the reactive current and the differential of the active current by a first coefficient and a second coefficient respectively; obtaining the sum of the result of multiplying the differential of the reactive current by the first coefficient and the result of multiplying the differential of the active current by the second coefficient; applying low-pass filtering on the sum to obtain a compensation; and superposing the compensation onto an original given angular frequency to perform V/F control.

9 Claims, 3 Drawing Sheets

(51) Int. Cl.
*H02P 9/10* (2006.01)
*H02P 27/04* (2016.01)
*H02P 21/05* (2006.01)
*H02P 23/04* (2006.01)

(56) References Cited

U.S. PATENT DOCUMENTS

| | | | |
|---|---|---|---|
| 2004/0008005 A1 | 1/2004 | Sakai et al. | |
| 2014/0145665 A1* | 5/2014 | Shouji | B60L 15/025 318/503 |
| 2014/0225548 A1* | 8/2014 | Xu | H02P 6/183 318/400.33 |

* cited by examiner

V/F CONTROL METHOD FOR SUPPRESSING CURRENT OSCILLATION OF INDUCTION MOTOR

FIELD OF THE INVENTION

The present invention relates to a control method for an induction motor and, more particularly, to a V/F control method for an induction motor.

BACKGROUND OF THE INVENTION

Figure 1:
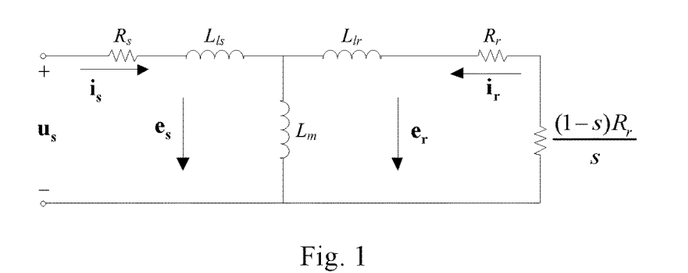
FIG. 1 illustrates an equivalent circuit of an induction motor.

Induction motor, also known as asynchronous motor, is an AC motor which drives a rotor to rotate with an electromagnetic torque produced by an interaction between a rotating magnetic field formed by a stator winding and a magnetic field of induced currents in a rotor winding. FIG. 1 shows an equivalent circuit of an induction motor.

Generally, the value of the air-gap flux is kept unchanged during the adjustment of the speed of the induction motor. If the magnetic flux is very small, the iron core of the motor cannot be fully utilized and therefore cannot output a high torque. However, if the magnetic flux is very large, the iron core of the motor will be saturated, which leads to an excessive exciting current and even a failure of the motor. For this reason, frequency conversion speed control must be performed on the premise of a constant air-gap flux.

According to the motor theory, in a three-phase induction motor, the effective value of the potential for each phase of a stator is expressed as:

$$|e_s|=4.44 f_1 N_s k_{Ns}\psi_m \qquad (1\text{-}1)$$

in which:

$e_s$ represents an amplitude of an induced electromotive force of the air-gap flux (or mutual flux) in the winding for each phase of the stator;

$f_1$ represents a current running frequency or a current frequency in the stator;

$N_s$ represents the number of turns in series of the winding for each phase of the stator;

$k_{Ns}$ represents a factor of the fundamental wave winding of the stator;

$\psi_m$ represents an amplitude of the air-gap flux for each pole.

According to equation (1-1), the air-gap flux linkage can be kept constant as long as the follow condition is satisfied:

$$\frac{e_s}{f_1} = \text{a constant value}$$

Typically, $e_s$ is replaced by a stator voltage since the counter electromotive force based on the air-gap flux cannot be measured directly. That is:

$$\frac{|u_s|}{f_1} = \text{a constant value}$$

$|u_s|$ represents the amplitude of the stator voltage $u_s$. This is well-known as V/F control principle. In brief, the rotate speed is changed by utilizing the frequency, and the flux linkage is kept constant by keeping $|u_s|/f_1$ unchanged.

Figure 2:
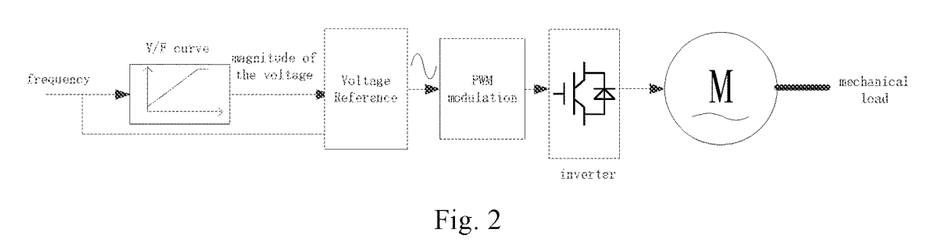
FIG. 2 is a diagram of a V/F control method.
Figure 3:
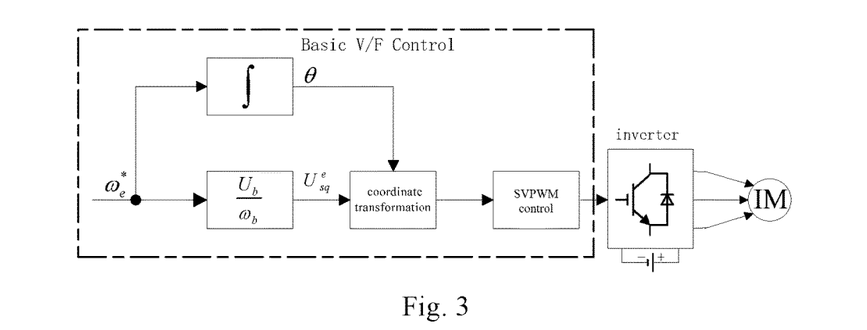
FIG. 3 is a flow diagram of a specific V/F control method.

FIG. 2 illustrates a process of basic V/F control. The process comprises: setting an amplitude of the voltage according to the V/F curve after a frequency has been set, and controlling an inverter through PWM modulation to output a three-phase AC voltage so as to control the operation of a motor. FIG. 3 illustrates a specific method of basic V/F control, wherein $\omega^*_e$ represents an angular velocity obtained from the frequency set by a user. As discussed above, the flux linkage can be kept constant by keeping $|U_s|/f_1$ unchanged. In order to keep $|u_s|/f_1$ unchanged, only the value of $U_b/\omega_b$ needs to be kept unchanged ($U_b$ represents a base value of the voltage and $\omega_b$ represents a base value of the angular frequency). Then, a desired stator voltage $U_{sq}^e$ can be obtained by multiplying $\omega^*_e$ by $U_b/\omega_b$. A rotation angle $\theta$ of the stator voltage vector can be obtained by integrating the above $\omega^*_e$. Thereby, phase voltages $U_A$, $U_B$ and $U_C$ of the three-phase stator can be obtained by performing coordinate transformation (including a transformation from rotating orthogonal coordinate system dq to static two-phase orthogonal coordinate system $\alpha\beta$ and a transformation from two-phase orthogonal coordinate system $\alpha\beta$ to three-phase ABC coordinate system) on $U_{sq}^e$ and $\theta$. A 6-channel PWM waveform can be output by applying the voltage space vector PWM (SVPWM) control technology to the phase voltages $U_A$, $U_B$, and $U_C$. The 6-channel PWM wave controls a switch tube of a three-phase inverter to achieve the control of an induction motor.

There is no oscillation when a motor runs under ideal conditions. However, when a frequency converter controls the motor, the oscillation of the output current may occur for the following reasons.

1) In addition to a fundamental component, a PWM waveform output also includes low-order and high-order harmonics. The harmonic current will cause torque ripples. Especially in the case that the frequency is low, the oscillation iii tends to occur since the moment of inertia of the motor and the mechanical load is small but the rotate speed ripple is large.

2) A dead zone factor. Since a dead time which can affect the fundamental voltage is set in the converter to prevent the bridge arms of the inverter from shoot-through, the low-order harmonic component is enlarged, which leads to is a distortion of the current, especially when the motor is in a no-load condition. That is, the oscillation tends to occur when the motor is in a no-load condition.

3) Since the V/F control belongs to the current open-loop control, rather than the closed-loop control based on the feedback current, the corresponding adjustments cannot be made when the current fluctuates slightly. Thus, the amplitude of the current fluctuations may increase and finally cause the current oscillation, until the converter alarms.

As described above, the V/F control belongs to the open-loop control, the output of which needs to be adjusted when the current fluctuates slightly. At present, methods for suppressing an oscillating current of a motor are mainly focused on fine tuning of the voltage output and frequency output.

A specific realization process for suppressing the oscillation by fine tuning of the voltage output comprises: setting a proper cut-off frequency for a sampled reactive current $i_{sd}^e$ or a sampled active current $i_{sq}^e$; extracting, by a filter, harmonic components; and obtaining a voltage compensation based on the harmonic components. Specifically, the compensation is obtained by superposing an extracted disturbance component of the stator current onto a given stator voltage.

A specific realization process for suppressing the oscillation by fine tuning of the frequency output comprises: setting a proper cut-off frequency for a sampled reactive current $i_{sd}^e$ or a sampled active current $i_{sq}^e$; extracting, by a filter, harmonic components; and obtaining a frequency compensation of the harmonic components by multiplying the harmonic components by different values as required. Specifically, the compensation is obtained by superposing an extracted disturbance component of the stator current onto a given frequency.

In the existing technology for suppressing the oscillation by fine tuning of the frequency output, since both of the reactive current $i_{sd}^{e}$ and the active current $i_{sq}^{e}$ are multiplied by the same coefficient, only the gain coefficient and the cut-off frequency of the filter are adjustable, and thereby the effect of the control method for suppressing the oscillation is limited.

BRIEF SUMMARY OF THE INVENTION

An object of the present invention is to provide a V/F control method for an induction motor which is able to further improve the effect of suppressing the oscillation.

The present invention provides a V/F control method for an induction motor, comprising:

1) extracting a reactive current and an active current and performing a differential calculation on them respectively to obtain a differential of the reactive current and a differential of the active current;

2) multiplying the differential of the reactive current and the differential of the active current by a predetermined first coefficient and a predetermined second coefficient respectively;

3) obtaining the sum of the result of multiplying the differential of the reactive current by the first coefficient and the result of multiplying the differential of the active current by the second coefficient;

4) applying low-pass filtering on the sum of step 3) to obtain a compensation; and 5) superposing the compensation onto an original given angular frequency to perform V/F control.

According to the method of the present invention, the first coefficient and the second coefficient are the same.

According to the method of the present invention, the first coefficient and the second coefficient are different.

According to the method of the present invention, step 5) comprises: superposing the compensation onto the original given angular frequency to obtain an output angular frequency, and integrating the output angular frequency to obtain a rotation angle of the stator voltage vector.

According to the method of the present invention, the ratio of the base value of the voltage to the base value of the angular frequency is kept unchanged, and a desired stator voltage is obtained by multiplying the ratio by the original given angular frequency.

The present invention also provides a V/F control device for an induction motor, comprising:

a differential unit for obtaining a differential of an extracted reactive current and a differential of an extracted active current by performing a differential calculation on the reactive current and the active current respectively;

a coefficient processing unit for multiplying the differential of the reactive current and the differential of the active current by a predetermined first coefficient and a predetermined second coefficient respectively;

a summation unit for obtaining the sum of the result of multiplying the differential of the reactive current by the first coefficient and the result of multiplying the differential of the active current by the second coefficient;

a low-pass filter for applying low-pass filtering on the result output by the summation unit to obtain a compensation; and a superposition unit for superposing the compensation onto an original given angular frequency to perform V/F control.

According to the device of the present invention, the first coefficient and the second coefficient are the same.

According to the device of the present invention, the first coefficient and the second coefficient are different.

According to the device of the present invention, the superposition unit superposes the compensation onto the original given angular frequency to obtain an output angular frequency, and obtain a rotation angle of the stator voltage vector by integrating the output angular frequency.

According to the method of the present invention, since two coefficients which can vary independently from each other are introduced before filtering, different values of the coefficients can be selected flexibly, so as to achieve the best effect of suppressing the oscillation.

BRIEF DESCRIPTION OF THE FIGURES

Embodiments of the present invention are described with reference to the following drawings, in which.

DETAILED DESCRIPTION OF THE INVENTION

In order to make the objects, the technical solutions and the advantages of the present invention more clear, the present invention will be explained in detail in conjunction with the following specific embodiments. It should be understood that the specific embodiments described here are only used to explain the present invention but not used to limit the present invention.

Figure 4:
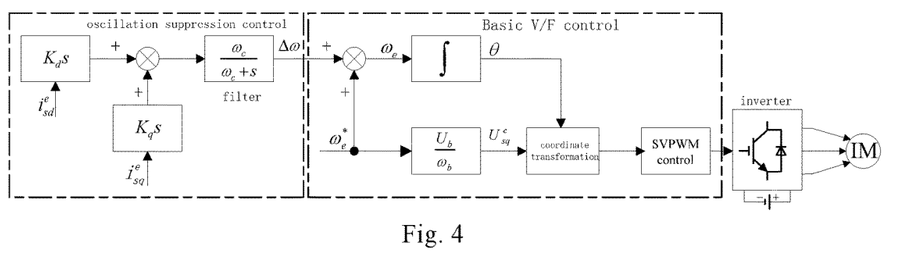
FIG. 4 is a flow diagram of a control method according to an embodiment of the present invention.

The present embodiment provides a V/F control method for an induction motor, a block diagram of which is shown in FIG. 4. The method comprises the steps of:

1) extracting a reactive current $i_{sd}^{e}$ and an active current $i_{sq}^{e}$, and performing a differential calculation on them respectively to obtain a differential $\Delta i_{sd}^{e}$ of the reactive current and a differential $\Delta i_{sq}^{e}$ of the active current;

2) multiplying the differential $\Delta i_{sd}^{e}$ of the reactive current and the differential $\Delta i_{sq}^{e}$ of the active current by coefficients $K_d$ and $K_q$, respectively, wherein $K_d$ and $K_q$ can vary independently from each other;

3) applying low-pass filtering (wherein $\omega_c$ is the cut-off frequency) on the sum of $\Delta i_{sd}^e K_d$ and $\Delta i_{sq}^e K_q$ by a filter to obtain a compensation $\Delta\omega$ of the real-time rotation angular frequency;

4) superposing the compensation $\Delta\omega$ onto an original given angular frequency $\omega^*_e$ (an angular frequency set by a user when performing V/F control) to obtain a final output angular frequency $\omega_e$, and then integrating $\omega_e$ to obtain a rotation angle $\theta$ of the stator voltage vector; in addition, multiplying $\omega^*_e$ by $U_b/\omega_b$ to obtain a desired stator voltage $U_{sq}^e$ while keeping the value of $U_b/\omega_b$ unchanged ($U_b$ represents a base value of the voltage and $\omega_b$ represents a base value of the angular frequency);

5) applying coordinate rotation transformation to the rotation angle $\theta$ of the stator voltage vector and the stator voltage $U_{sq}^e$ (including a transformation from rotating orthogonal coordinate system dq to static two-phase orthogonal coordinate system $\alpha\beta$ and a transformation from two-phase orthogonal coordinate system $\alpha\beta$ to three-phase ABC coordinate system);

6) obtaining a 6-channel PWM waveform by applying the voltage space vector PWM (SVPWM) control technology to phase voltages $U_A$, $U_B$ and $U_C$ of the three-phase stator obtained in step 5), wherein the 6-channel PWM wave is used to control a switch tube of a three-phase inverter, thereby to achieve the control of the induction motor.

Since the method described above is a method that suppresses the oscillation based on the frequency adjustment, the output voltage should not be affected. Therefore, in order not to affect the output voltage, an original given angular frequency $\omega^*_e$ is still used to obtain the value of the output voltage.

According to the V/F control method for an induction motor provided in the present embodiment, after differential calculating, the differential of the reactive current and the differential of the active current can be multiplied by different coefficients $K_d$ and $K_q$ as required and the compensation $\Delta\omega$ of the real-time rotation angular frequency can be obtained by filtering the sum of $\Delta i_{sd}^e K_d$ and $\Delta i_{sq}^e$, $K_q$ with the filter. Then, the output angular frequency $\omega_e$ is obtained by superposing the compensation $\Delta\omega$ onto the original given angular frequency $\omega^*_e$ and the rotation angle $\theta$ of the stator voltage vector is obtained by integrating $\omega_e$. Since two coefficients are introduced before filtering and more variables lead to more flexible changes, the effect of suppressing the oscillation can be further improved.

The present invention also provides a V/F control device for an induction motor. The device comprises:

data processing units $K_d$s and $K_q$s, including a differential unit and a coefficient processing unit, wherein the differential unit is used for obtaining a differential of an extracted reactive current and a differential of an extracted active current by performing a differential calculation on the reactive current and the active current respectively, and the coefficient processing unit is used for multiplying the differential of the reactive current and the differential of the active current by a predetermined first coefficient and a predetermined second coefficient respectively;

a summation unit for obtaining the sum of the result of multiplying the differential of the reactive current by the first coefficient and the result of multiplying the differential of the active current by the second coefficient;

a low-pass filter for applying low-pass filtering on the result output by the summation unit to obtain a compensation;

a superposition unit for superposing the compensation onto an original given angular frequency, so as to perform V/F control.

As known to those skilled in the art, the V/F control device can be implemented by various means known in the art, such as hardwares, softwares or the combination thereof.

To verify the effect of the method for suppressing the oscillation mentioned above, the Matlab simulation results are provided below.

The MATLAB simulation is built on the basis that the voltage is oriented. Since the voltage of the stator is given by an inverter to ensure the accuracy for the voltage orientation, the analysis results can provide a meaningful reference. iii The running state of a motor can be determined according to a dynamic math model which represents the operation of the motor. A five-order state equation representing the operation of a motor contains all related information about the operation of the motor.

A small signal math model equation of the motor can be obtained according to the state equation which represents the operation of the motor. The stability of a system can be determined according to the poles obtained by solving a small signal matrix. If all of the poles fall at the negative half axis of the coordinate system, then the system is considered to be stable.

Small Signal Model

The five-order equation for the operation of a motor is expressed as follows:

$$s\begin{bmatrix} 1_{sd}^{*e} \\ 1_{sq}^{*e} \\ \psi_{rd}^e \\ \psi_{rq}^e \\ \omega_r \end{bmatrix} = \begin{bmatrix} -\dfrac{R_s L_r^2 + R_r L_m^2}{\sigma L_s L_r^2} & \omega_e & \dfrac{L_m}{\sigma L_s L_r \tau_r} & \dfrac{L_m}{\sigma L_s L_r}\omega_r & 0 \\ -\omega_e & -\dfrac{R_s L_r^2 + R_r L_m^2}{\sigma L_s L_r^2} & -\dfrac{L_m}{\sigma L_s L_r}\omega_r & \dfrac{L_m}{\sigma L_s L_r \tau_r} & 0 \\ \dfrac{L_m}{\tau_r} & 0 & -\dfrac{1}{\tau_r} & \omega_s & 0 \\ 0 & \dfrac{L_m}{\tau_r} & -\omega_s & -\dfrac{1}{\tau_r} & 0 \\ -\dfrac{1.5 N_p^2 L_m \psi_{rq}^e}{J L_r} & \dfrac{1.5 N_p^2 L_m \psi_{rd}^e}{J L_r} & 0 & 0 & 0 \end{bmatrix} \quad (1\text{-}4)$$

$$\begin{bmatrix} 1_{sd}^{*e} \\ 1_{sq}^{*e} \\ \psi_{rd}^e \\ \psi_{rq}^e \\ \omega_r \end{bmatrix} + \begin{bmatrix} \dfrac{1}{\sigma L_s} & 0 & 0 \\ 0 & \dfrac{1}{\sigma L_s} & 0 \\ 0 & 0 & 0 \\ 0 & 0 & 0 \\ 0 & 0 & -\dfrac{N_p}{J} \end{bmatrix} \begin{bmatrix} u_{sd}^e \\ u_{sq}^e \\ T_L \end{bmatrix}$$

The equation (1-4) contains all related information about the operation of the motor.

The small signal model is expressed as follows:

$$s\begin{bmatrix}\Delta i^e_{sd}\\ \Delta i^e_{sq}\\ \Delta \psi^e_{rd}\\ \Delta \psi^e_{rq}\\ \Delta \omega_r\end{bmatrix}=\begin{bmatrix}-\dfrac{R_sL_r^2+R_rL_m^2}{\sigma L_sL_r^2} & \omega_e^* & \dfrac{L_m}{\sigma L_sL_r\tau_r} & \dfrac{L_m}{\sigma L_sL_r}\omega_r & \dfrac{L_m}{\sigma L_sL_r}\psi^e_{rq} & i^e_{sq}\\ -\omega_e^* & -\dfrac{R_sL_r^2+R_rL_m^2}{\sigma L_sL_r^2} & -\dfrac{L_m}{\sigma L_sL_r}\omega_r & \dfrac{L_m}{\sigma L_sL_r\tau_r} & -\dfrac{L_m}{\sigma L_sL_r}\psi^e_{rd} & -i^e_{sd}\\ \dfrac{L_m}{\tau_r} & 0 & -\dfrac{1}{\tau_r} & \omega_s & -\psi^e_{rq} & \psi^e_{rq}\\ 0 & \dfrac{L_m}{\tau_r} & -\omega_s & -\dfrac{1}{\tau_r} & \psi^e_{rd} & -\psi^e_{rd}\\ -\dfrac{1.5N_p^2L_m\psi^e_{rq}}{JL_r} & \dfrac{1.5N_p^2L_m\psi^e_{rd}}{JL_r} & \dfrac{1.5N_p^2L_mi^e_{sq}}{JL_r} & -\dfrac{1.5N_p^2L_mi^e_{sd}}{JL_r} & 0 & 0\end{bmatrix}$$
(1-5)

$$\begin{bmatrix}\Delta i^e_{sd}\\ \Delta i^e_{sq}\\ \Delta \psi^e_{rd}\\ \Delta \psi^e_{rq}\\ \Delta \omega_r\\ \Delta \omega_e\end{bmatrix}+\begin{bmatrix}\dfrac{1}{\sigma L_s} & 0 & 0\\ 0 & \dfrac{1}{\sigma L_s} & 0\\ 0 & 0 & 0\\ 0 & 0 & 0\\ 0 & 0 & 0\\ 0 & 0 & -\dfrac{N_p}{J}\end{bmatrix}\begin{bmatrix}\Delta u^e_{sd}\\ \Delta u^e_{sq}\\ \Delta T_L\end{bmatrix}$$

A small-signal perturbation of a frequency is expressed as:

$$\Delta\omega_e = s\Delta i^e_{sdq} \quad (1\text{-}6)$$

in which:

$$\Delta i^e_{sdq}=\dfrac{\omega_c}{\omega_c+s}(K_d\Delta i^e_{sd}+K_q\Delta i^e_{sq})\rightarrow s\Delta i^e_{sdq}= \quad (1\text{-}7)$$

$$-\omega_c\Delta i^e_{sdq}+\omega_cK_d\Delta i^e_{sd}+\omega_cK_q\Delta i^e_{sq}$$

The equation (1-7) can be simplified as:

$$\Delta\omega_e=-\omega_c\Delta i^e_{sdq}+\omega_cK_d\Delta i^e_{sd}+\omega_cK_q\Delta i^e_{sq} \quad (1\text{-}8)$$

Now, the equation (1-5) can be expressed as follows:

$$s\begin{bmatrix}\Delta i^e_{sd}\\ \Delta i^e_{sq}\\ \Delta \psi^e_{rd}\\ \Delta \psi^e_{rq}\\ \Delta \omega_r\end{bmatrix}=\begin{bmatrix}-\dfrac{R_sL_r^2+R_rL_m^2}{\sigma L_sL_r^2} & \omega_e^* & \dfrac{L_m}{\sigma L_sL_r\tau_r} & \dfrac{L_m}{\sigma L_sL_r}\omega_r & \dfrac{L_m}{\sigma L_sL_r}\psi^e_{rq} & i^e_{sq}\\ -\omega_e^* & -\dfrac{R_sL_r^2+R_rL_m^2}{\sigma L_sL_r^2} & -\dfrac{L_m}{\sigma L_sL_r}\omega_r & \dfrac{L_m}{\sigma L_sL_r\tau_r} & -\dfrac{L_m}{\sigma L_sL_r}\psi^e_{rd} & -i^e_{sd}\\ \dfrac{L_m}{\tau_r} & 0 & -\dfrac{1}{\tau_r} & \omega_s & -\psi^e_{rq} & \psi^e_{rq}\\ 0 & \dfrac{L_m}{\tau_r} & -\omega_s & -\dfrac{1}{\tau_r} & \psi^e_{rd} & -\psi^e_{rd}\\ -\dfrac{1.5N_p^2L_m\psi^e_{rq}}{JL_r} & \dfrac{1.5N_p^2L_m\psi^e_{rd}}{JL_r} & \dfrac{1.5N_p^2L_mi^e_{sq}}{JL_r} & -\dfrac{1.5N_p^2L_mi^e_{sd}}{JL_r} & 0 & 0\end{bmatrix}$$
(1-9)

$$\begin{bmatrix}\Delta i^e_{sd}\\ \Delta i^e_{sq}\\ \Delta \psi^e_{rd}\\ \Delta \psi^e_{rq}\\ \Delta \omega_r\\ -\omega_c\Delta i^e_{sdq}+\omega_cK_d\Delta i^e_{sd}+\omega_cK_q\Delta i^e_{sq}\end{bmatrix}+\begin{bmatrix}\dfrac{1}{\sigma L_s} & 0 & 0\\ 0 & \dfrac{1}{\sigma L_s} & 0\\ 0 & 0 & 0\\ 0 & 0 & 0\\ 0 & 0 & 0\\ 0 & 0 & -\dfrac{N_p}{J}\end{bmatrix}\begin{bmatrix}\Delta u^e_{sd}\\ \Delta u^e_{sq}\\ \Delta T_L\end{bmatrix}$$

And the equation (1-9) can be re-expressed as follows:

$$(1\text{-}10)$$

$$s\begin{bmatrix} \Delta i_{sd}^e \\ \Delta i_{sq}^e \\ \Delta \psi_{rd}^e \\ \Delta \psi_{rq}^e \\ \Delta \omega_r \\ \Delta i_{sdq}^e \end{bmatrix} = \begin{bmatrix} -\frac{R_s L_r^2 + R_r L_m^2}{\sigma L_s L_r^2} + \omega_c K_d i_{sq}^e & \omega_e^* + \omega_c K_q i_{sq}^e & \frac{L_m}{\sigma L_s L_r \tau_r} & \frac{L_m}{\sigma L_s L_r}\omega_r & \frac{L_m}{\sigma L_s L_r}\psi_{rq}^e & -\omega_c i_{sq}^e \\ -\omega_e^* - \omega_c K_d i_{sd}^e & -\frac{R_s L_r^2 + R_r L_m^2}{\sigma L_s L_r^2} - \omega_c K_q i_{sd}^e & -\frac{L_m}{\sigma L_s L_r}\omega_r & \frac{L_m}{\sigma L_s L_r \tau_r} & -\frac{L_m}{\sigma L_s L_r}\psi_{rd}^e & \omega_c i_{sd}^e \\ \frac{L_m}{\tau_r} + \omega_c K_d \psi_{rq}^e & \omega_c K_q \psi_{rq}^e & -\frac{1}{\tau_r} & \omega_s & -\psi_{rq}^e & -\omega_c \psi_{rq}^e \\ -\omega_c K_d \psi_{rd}^e & \frac{L_m}{\tau_r} + \omega_c K_d \psi_{rd}^e & -\omega_s & -\frac{1}{\tau_r} & \psi_{rd}^e & \omega_c \psi_{rd}^e \\ -\frac{1.5 N_p^2 L_m \psi_{rq}^e}{JL_r} & \frac{1.5 N_p^2 L_m \psi_{rd}^e}{JL_r} & \frac{1.5 N_p^2 L_m i_{sq}^e}{JL_r} & -\frac{1.5 N_p^2 L_m i_{sd}^e}{JL_r} & 0 & 0 \\ \omega_c K_d & \omega_c K_q & 0 & 0 & 0 & -\omega_c \end{bmatrix}$$

$$\begin{bmatrix} \Delta i_{sd}^e \\ \Delta i_{sq}^e \\ \Delta \psi_{rd}^e \\ \Delta \psi_{rq}^e \\ \Delta \omega_r \\ \Delta i_{sdq}^e \end{bmatrix} + \begin{bmatrix} \frac{1}{\sigma L_s} & 0 & 0 \\ 0 & \frac{1}{\sigma L_s} & 0 \\ 0 & 0 & 0 \\ 0 & 0 & 0 \\ 0 & 0 & -\frac{N_p}{J} \\ 0 & 0 & 0 \end{bmatrix} \begin{bmatrix} \Delta u_{sd}^e \\ \Delta u_{sq}^e \\ \Delta T_L \end{bmatrix}$$

The definitions of each symbol appeared in the above equations:

$i_{sd}^e$, $i_{sq}^e$—currents in the motor stator;
$\psi_{rd}^e$, $\psi_{rq}^e$—magnetic linkages of the motor rotor;
$\omega_r$—a rotate speed of the motor rotor;
$R_s$—a resistance of the motor stator;
$R_r$—a resistance of the motor rotor;
$L_s$—an inductance of the motor stator;
$L_r$—an inductance of the motor rotor;
$L_m$—a mutual inductance of the motor;
$\sigma$—a magnetic leakage factor of the motor, $\sigma=1-L_m^2/L_s L_r$;
$\omega_e$—asynchronous rotate speed of the motor;
$\omega_e^*$—a given rotate speed;
$\tau_r$—an electromagnetic time constant of the motor rotor, $\tau_r=L_r/R_r$;
$N_p$—the number of pole-pairs of the motor;
J—a moment of inertia of the motor;
$T_L$—a load torque;
$\Delta T_L$—a differential of the load torque;
$u_{sd}^e$, $u_{sq}^e$—voltages across the motor stator;
$\Delta i_{sd}^e$, $\Delta i_{sq}^e$—differentials of currents in the motor stator;
$\Delta \psi_{rd}^e$, $\Delta \psi_{rq}^e$—differentials of magnetic linkages of the motor rotor;
$\Delta \omega_r$—a differential of the rotate speed of the motor rotor;
$\Delta \omega_e$—a differential of the synchronous rotate speed of the motor;
$\Delta i_{sdq}^e$—a small-signal perturbation of a current in the motor stator.

Solution and Analysis of the Roots of the Small Signal Equation

The small signal equation for the operation of a motor can be obtained through analysis, and the distribution of the eigenvalues of the small signal matrix can be analyzed to determine whether the system is stable. If all of the poles fall at the negative half axis of the coordinate system, then the system is considered to be stable.

For the sake of simplicity, typically, another distribution diagram (i.e., a contour distribution diagram of the speed and the torque) is also used to determine whether the system is stable during the simulation analysis. If the eigenvalues are all negative while the speed is within a required range, then the system is considered as stable.

Figure 5:
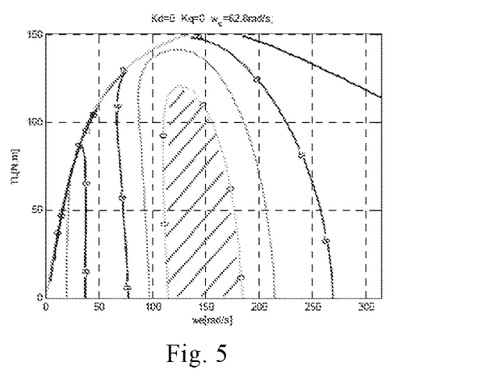
FIG. 5 is a distribution diagram of the dominant poles in the case that the V/F control method for suppressing the oscillation has not been used in the motor.

In the simulation analysis, the effects for a 15 KW motor with oscillation suppression and without oscillation suppression are analyzed respectively. FIG. 5 illustrates a distribution diagram of the dominant poles when using a V/F control method without oscillation suppression on the motor. The distribution diagram of the dominant poles shows that the system is not stable under 110-185 rad/s (17.5 Hz~29.4 Hz) when each of the coefficients $K_d$ and $K_q$ is equal to 0.

Figure 6:
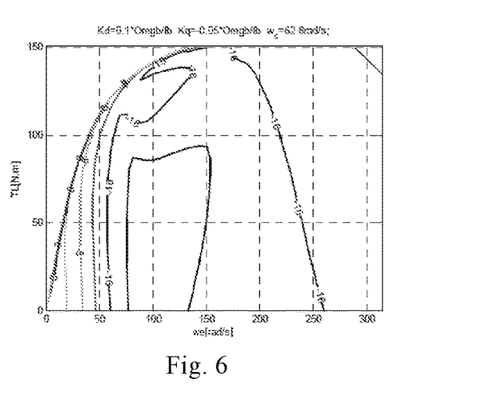
FIG. 6 is a distribution diagram of the dominant poles in the case that the V/F control method for suppressing the oscillation has been used in the motor.

FIG. 6 illustrates a distribution diagram of the dominant poles when using a V/F control method with oscillation suppression of the present invention on the 15 KW motor. The distribution diagram of the dominant poles shows that the system is stable under 0 Hz~50 Hz when $K_d$=0.1, $K_q$=0.05 and the cut-off frequency of the filter is 10 Hz ($\omega_c$=62.8 rad/s). This shows that the control method of the present invention can suppress the oscillation of a motor effectively.

Verification of the Effect of Suppressing the Oscillation Based on Experiments

Figure 7:
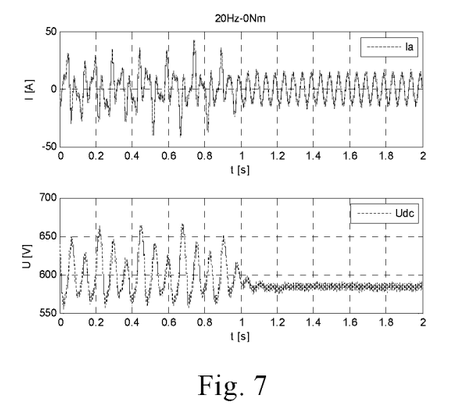
FIG. 7 illustrates a comparison diagram of current waveforms of a 15 KW motor between two cases (i.e., the method of the present invention has been used in the 15 KW motor and the method of the present invention has not been used in the 15 KW motor), and a comparison diagram of bus voltage waveforms of the 15 KW motor between these two cases.

FIG. 7 illustrates a comparison diagram of the current waveforms of the 15 KW motor between two cases, i.e., the method of the present invention has not been used in the 15 KW motor (i.e., the left part of FIG. 7) and the method of the present invention has been used in the 15 KW motor (i.e., the right part of FIG. 7), and a comparison diagram of the bus voltage waveforms of the 15 KW motor between these two cases. The result of the comparison shows that the method of the present invention can suppress the oscillation of the motor effectively.

In the above embodiment, the effect of suppressing the oscillation is further improved, since two coefficients $K_d$ and $K_q$ (the coefficients $K_d$ and $K_q$ can be the same or different) which can vary independently from each other are introduced before filtering and more variables lead to more flexible changes.

It should be noted that the above embodiments are only used to illustrate the technical solution of the present invention, without limiting the present invention. Although the present invention has been described in detail with reference to the embodiments, one of ordinary skill in the art will appreciate that the modifications and replacements of the present technical solution without departing from the spirit and scope of the present technical solution, are all covered in the scope of the claims of the present invention.

What is claimed is:

1. A V/F control method for an induction motor, comprising:
1) extracting a reactive current and an active current, and performing a differential calculation on them respectively to obtain a differential of the reactive current and a differential of the active current;
2) multiplying the differential of the reactive current and the differential of the active current by a predetermined first coefficient and a predetermined second coefficient respectively;
3) obtaining the sum of the result of multiplying the differential of the reactive current by said first coefficient and the result of multiplying the differential of the active current by said second coefficient;
4) applying low-pass filtering on the sum of step 3) to obtain a compensation; and
5) superposing the compensation onto an original given angular frequency to perform V/F control of the induction motor and thereby control operation of the induction motor;
wherein step 5) comprises controlling an inverter through pulse width modulation (PWM) based on the superposing of the compensation onto the original given angular frequency, to cause the inverter to output a three-phase AC voltage that controls operation of the induction motor.

2. The method of claim 1, wherein said first coefficient and said second coefficient are the same.

3. The method of claim 1, wherein said first coefficient and said second coefficient are different.

4. The method of claim 1, wherein step 5) comprises: superposing said compensation onto said original given angular frequency to obtain an output angular frequency, and integrating said output angular frequency to obtain a rotation angle of the stator voltage vector, with the inverter being controlled through PWM based on the rotation angle of the stator voltage vector.

5. The method of claim 1, wherein the ratio of a base value of the voltage to a base value of the angular frequency is kept unchanged, and a desired stator voltage is obtained by multiplying the ratio by said original given angular frequency.

6. A V/F control device for an induction motor, comprising:
a differential unit programmed to obtain a differential of an extracted reactive current and a differential of an extracted active current by performing a differential calculation on the reactive current and the active current respectively;
a coefficient processing unit programmed to multiply said differential of the reactive current and said differential of the active current by a predetermined first coefficient and a predetermined second coefficient respectively;
a summation unit programmed to obtain the sum of the result of multiplying the differential of the reactive current by said first coefficient and the result of multiplying the differential of the active current by said second coefficient;
a low-pass filter programmed to apply low-pass filtering on the result output by the summation unit to obtain a compensation;
a superposition unit programmed to superpose the compensation onto an original given angular frequency to perform V/F control of the induction motor; and
a pulse width modulation (PWM) unit programmed to control an inverter through PWM based on the compensation superimposed onto the original given angular frequency, to cause the inverter to output a three-phase AC voltage that controls operation of the induction motor.

7. The device of claim 6, wherein said first coefficient and said second coefficient are the same.

8. The device of claim 6, wherein said first coefficient and said second coefficient are different.

9. The device of claim 6, wherein said superposition unit superposes said compensation onto said original given angular frequency to obtain an output angular frequency, and integrates said output angular frequency to obtain a rotation angle of the stator voltage vector, with the inverter being controlled through PWM based on the rotation angle of the stator voltage vector.

\* \* \* \* \*